United States Patent
Wolschlager

(10) Patent No.: US 11,233,442 B2
(45) Date of Patent: Jan. 25, 2022

(54) ROTARY POSITION SENSOR INCLUDING SWITCH AND PATTERNED MAGNET

(71) Applicant: CTS Corporation, Lisle, IL (US)

(72) Inventor: Kevin C. Wolschlager, Elkhart, IN (US)

(73) Assignee: CTS Corporation, Lisle, IL (US)

( * ) Notice: Subject to any disclaimer, the term of this patent is extended or adjusted under 35 U.S.C. 154(b) by 294 days.

(21) Appl. No.: 16/180,532

(22) Filed: Nov. 5, 2018

(65) Prior Publication Data

US 2019/0140524 A1     May 9, 2019

Related U.S. Application Data

(60) Provisional application No. 62/582,832, filed on Nov. 7, 2017.

(51) Int. Cl.
| | |
|---|---|
| *H02K 11/215* | (2016.01) |
| *G01D 5/14* | (2006.01) |
| *H02K 7/00* | (2006.01) |
| *H02K 7/116* | (2006.01) |

(52) U.S. Cl.
CPC ........... *H02K 11/215* (2016.01); *G01D 5/145* (2013.01); *H02K 7/003* (2013.01); *H02K 7/116* (2013.01)

(58) Field of Classification Search
CPC ...... H02K 11/215; G01D 5/142; G01D 5/145; G01R 33/06
See application file for complete search history.

(56) References Cited

U.S. PATENT DOCUMENTS

| | | | |
|---|---|---|---|
| 5,300,848 | A | 4/1994 | Huss et al. |
| 5,698,910 | A | 12/1997 | Bryant et al. |
| 5,886,517 | A | 3/1999 | Reichmann et al. |
| 6,127,752 | A | 10/2000 | Wiesler et al. |
| 6,211,794 | B1 | 4/2001 | DeSoto et al. |
| 6,771,065 | B2 | 8/2004 | Pointer |
| 7,141,904 | B2 | 11/2006 | Mirescu |

(Continued)

FOREIGN PATENT DOCUMENTS

FR           3056841 A1 * 3/2018 ........... H02K 7/1166

OTHER PUBLICATIONS

W. D. Collins and R. Brown, "Synchronous running of shaded-pole permanent magnet motors," in IMA Journal of Applied Mathematics, vol. 73, No. 5, pp. 703-723, Oct. 2008.

*Primary Examiner* — Ramon M Barrera
(74) *Attorney, Agent, or Firm* — Daniel Deneufbourg

(57) ABSTRACT

A rotary position sensor comprising a rotatable patterned ring magnet, which in one embodiment is mounted on the output shaft of an actuator, and includes a plurality of pairs of North and South Pole sections extending around the circumference of the ring magnet in an alternating relationship and defining a plurality of circumferentially extending magnetic field switch points spaced predetermined distances on the ring magnet corresponding to a plurality of predetermined unique positions of the ring magnet adapted for sensing by a switch such as Hall Effect switch. In one embodiment, the ring magnet includes a plurality of pairs of North and South Pole sections and switch points on the ring magnet of different predetermined lengths and predetermined locations respectively corresponding to a plurality of predetermined ring magnet positions to be sensed.

9 Claims, 5 Drawing Sheets

(56) References Cited

U.S. PATENT DOCUMENTS

| | | | |
|---|---|---|---|
| 7,752,943 B2 | 7/2010 | Maruyama et al. | |
| 8,324,892 B2 * | 12/2012 | Rudel | G01D 5/2455 |
| | | | 324/207.25 |
| 8,390,277 B2 * | 3/2013 | Takeuchi | H02K 29/12 |
| | | | 324/207.25 |
| 8,975,793 B2 | 3/2015 | Palfenier et al. | |
| 9,322,632 B2 | 4/2016 | Zhou et al. | |
| 2001/0002599 A1 | 6/2001 | Apel et al. | |
| 2004/0119465 A1 | 6/2004 | Clark | |
| 2005/0035759 A1 | 2/2005 | Herbert et al. | |
| 2010/0072988 A1 * | 3/2010 | Hammerschmidt | G01R 33/093 |
| | | | 324/207.25 |
| 2011/0273789 A1 | 11/2011 | Knoedgen | |
| 2015/0008907 A1 * | 1/2015 | Janisch | G01D 5/24461 |
| | | | 324/207.25 |
| 2015/0226581 A1 * | 8/2015 | Schott | G01D 5/145 |
| | | | 324/207.2 |
| 2016/0123774 A1 | 5/2016 | Foletto et al. | |
| 2017/0089940 A1 * | 3/2017 | Bussan | G01D 5/2451 |
| 2017/0237312 A1 | 8/2017 | Stewart et al. | |
| 2017/0370961 A1 | 12/2017 | Hashimoto et al. | |
| 2018/0087549 A1 | 3/2018 | Modinger et al. | |

* cited by examiner

ROTARY POSITION SENSOR INCLUDING SWITCH AND PATTERNED MAGNET

CROSS-REFERENCE TO RELATED APPLICATIONS

This patent application claims priority and benefit of the filing date of U.S. Provisional Patent Application Ser. No. 62/582,83 filed on Nov. 7, 2017, the disclosure and contents of which is expressly incorporated herein in its entirety by reference.

FIELD OF THE INVENTION

This invention relates generally to a rotary position sensor and, more specifically to an actuator with a rotary position sensor including a switch and a patterned magnet.

BACKGROUND OF THE INVENTION

Actuators are used in the automotive industry to actuate vehicle engine components including for example the vanes of a vehicle engine turbocharger.

Currently, the position of the actuator is determined via the use of a rotary position sensor. Traditionally, Hall Effect sensor based sensors that sense and measure changes in the magnitude and/or direction of the magnetic field generated by a magnet have been used for sensing the position of the output shaft of an actuator. Position sensors have also been used that include a Hall Effect switch/latch and simple magnet on the rotatable output shaft. Back biased Hall Effect switches/latches have also been used in combination with an output shaft including voids or other features adapted to be sensed by the Hall Effect switch/latch.

The present invention is directed to a new, simple, and inexpensive rotary position sensor adapted for use in for example a vehicle engine component actuator that uses a switch and a rotatable patterned ring magnet mounted to the output shaft of the actuator.

SUMMARY OF THE INVENTION

The present invention is directed generally to a rotary position sensor comprising a rotatable ring magnet including at least a first pair of North and South Pole sections, each of the North and South Pole sections having a length, and a switch spaced from the ring magnet and adapted for sensing changes in the magnetic field generated by the ring magnet in response to the rotation of the ring magnet relative to the switch, the length of the respective North and South Pole sections of the ring magnet being predetermined to correspond to the one or more positions of the ring magnet adapted for sensing by the switch.

In one embodiment, the North and South Pole sections has a different length for sensing different positions of the ring magnet.

In one embodiment, the ring magnet is mounted to an output shaft of an actuator.

In one embodiment, the ring magnet is mounted to an end face of the output shaft and the ring magnet is magnetized in an axial direction relative to the output shaft.

In one embodiment, the switch is a Hall Effect switch.

In one embodiment, the rotatable ring magnet includes a plurality of pairs of North and South Pole sections extending around the circumference of the ring magnet in an alternating North and South Pole relationship and defining a plurality of North and South Pole switch points extending around the circumference of the ring magnet in a predetermined spaced relationship corresponding to a predetermined plurality of positions of the ring magnet adapted to be sensed by the switch.

The present invention is also directed to a rotary position sensor adapted for sensing the position of a rotatable output shaft on an actuator, the rotary position sensor comprising a ring magnet mounted to the output shaft and rotatable in response to the rotation of the output shaft, the ring magnet being magnetized to include a plurality of North and South Pole sections, each of the North and South Pole sections having a length, and a switch spaced from the ring magnet and adapted for sensing changes in the magnetic field generated by the ring magnet in response to the rotation of the ring magnet and the output shaft relative to the switch, the length of the respective North and South Pole sections of the ring magnet corresponding to a plurality of positions of the ring magnet adapted for sensing by the switch.

In one embodiment, the North and South Pole sections have different lengths corresponding to different positions of the ring magnet adapted for sensing by the switch.

In one embodiment, the ring magnet is mounted to an end face of the ring magnet and is magnetized in a direction axial to the output shaft.

In one embodiment, the rotatable ring magnet includes a plurality of pairs of North and South Pole sections extending around the circumference of the ring magnet in an alternating North and South Pole relationship and defining a plurality of North and South Pole switch points extending around the circumference of the ring magnet in a predetermined spaced relationship corresponding to a predetermined plurality of positions of the ring magnet adapted to be sensed by the switch.

The present invention is further directed to an actuator comprising a housing defining an interior cavity, an actuator motor located in the interior cavity, a plurality of gears located in the housing including a rotatable output gear assembly, and a rotary position sensor including a ring magnet mounted to the output gear assembly and rotatable in response to the rotation of the output gear assembly, the ring magnet being magnetized to include a plurality of North and South Pole sections, each of the North and South Pole sections having a length, and a switch spaced from the ring magnet and adapted for sensing changes in the magnetic field generated by the ring magnet in response to the rotation of the ring magnet and the output gear assembly relative to the switch, the length of the respective North and South Pole sections of the ring magnet corresponding to a plurality of positions of the ring magnet and the output gear assembly adapted for sensing by the switch.

In one embodiment, the ring magnet has been magnetized in a pattern including a plurality of diametrically opposed pairs of North and South Pole sections extending around the circumference of the ring magnet in an alternating and abutting relationship and defining a plurality of North and South Pole switch points extending around the circumference of the ring magnet and corresponding to the plurality of positions of the ring magnet and the output gear assembly adapted for sensing by the switch.

In one embodiment, the switch is a Hall Effect switch.

In one embodiment, the output gear assembly includes an output gear having an end face defining a ring shaped cavity adapted to receive the ring magnet.

In one embodiment, the end face of the output gear defines a plurality of grooves and the ring magnet includes a plurality of fingers fitted within the plurality of grooves for indexing the ring magnet on the output gear.

Other advantages and features of the present invention will be more readily apparent from the following detailed description of the preferred embodiment of the invention, the accompanying drawings, and the appended claims.

BRIEF DESCRIPTION OF THE DRAWINGS

These and other features of the invention can best be understood by the description of the accompanying FIGS as follows.

DESCRIPTION OF THE EMBODIMENT

Figure 1:
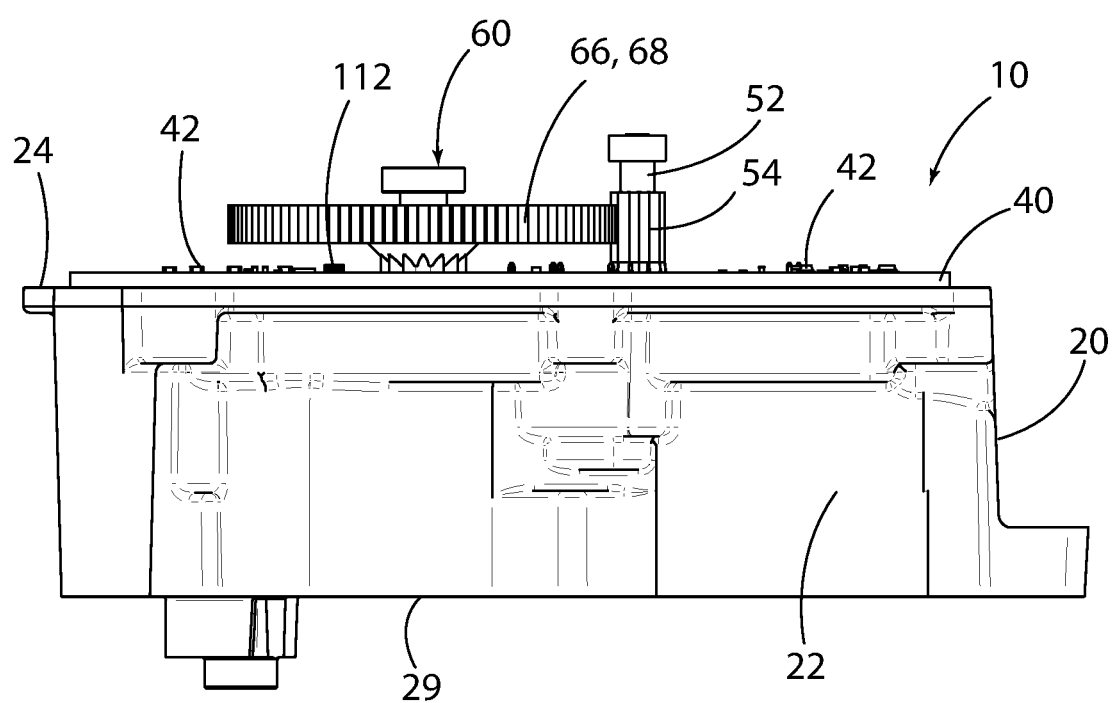
FIG. 1 is a perspective view of an actuator incorporating a rotary position sensor in accordance with the present invention.
Figure 2:
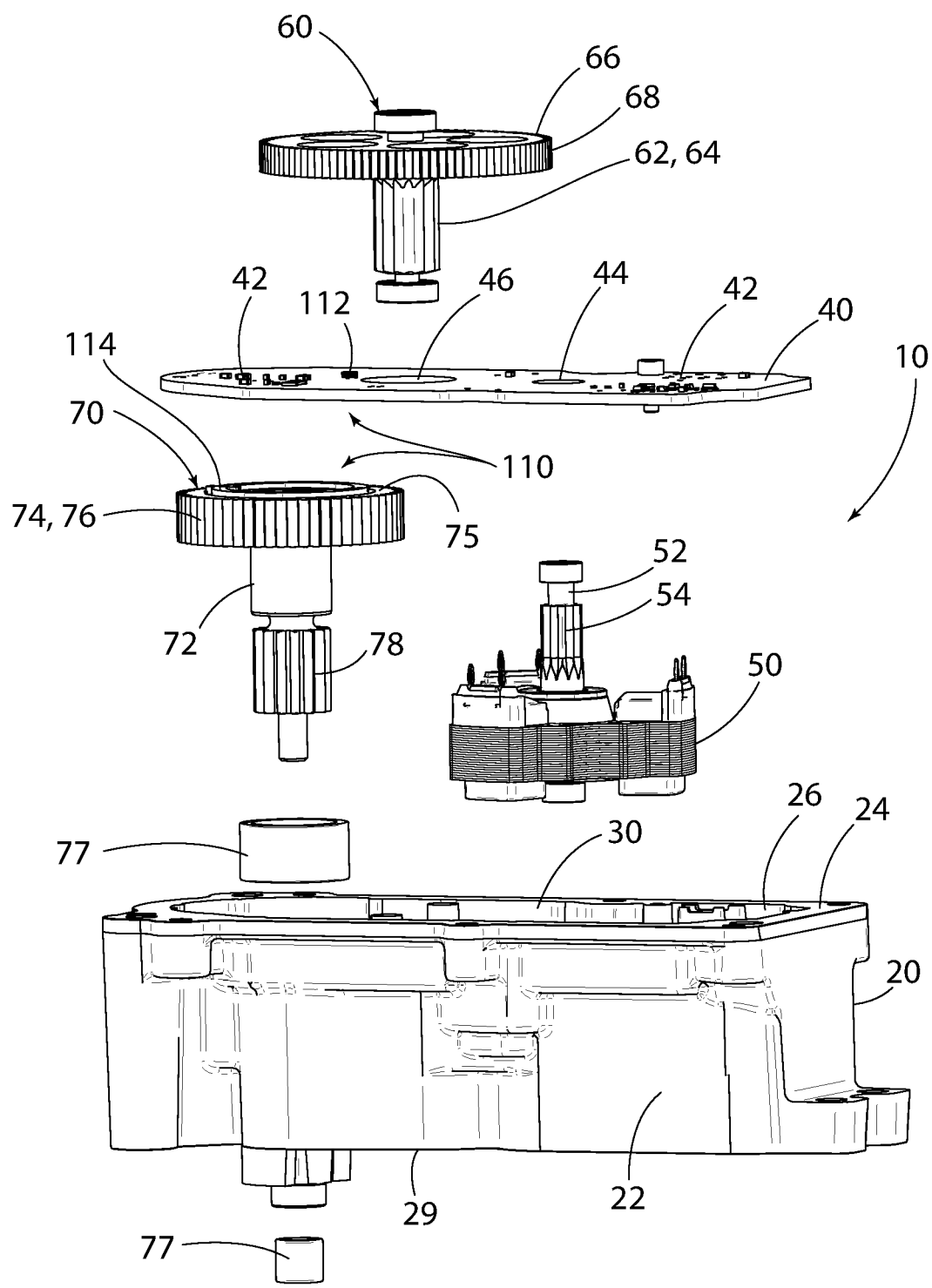
FIG. 2 is an exploded perspective view of the actuator shown in FIG. 1.
Figure 3:
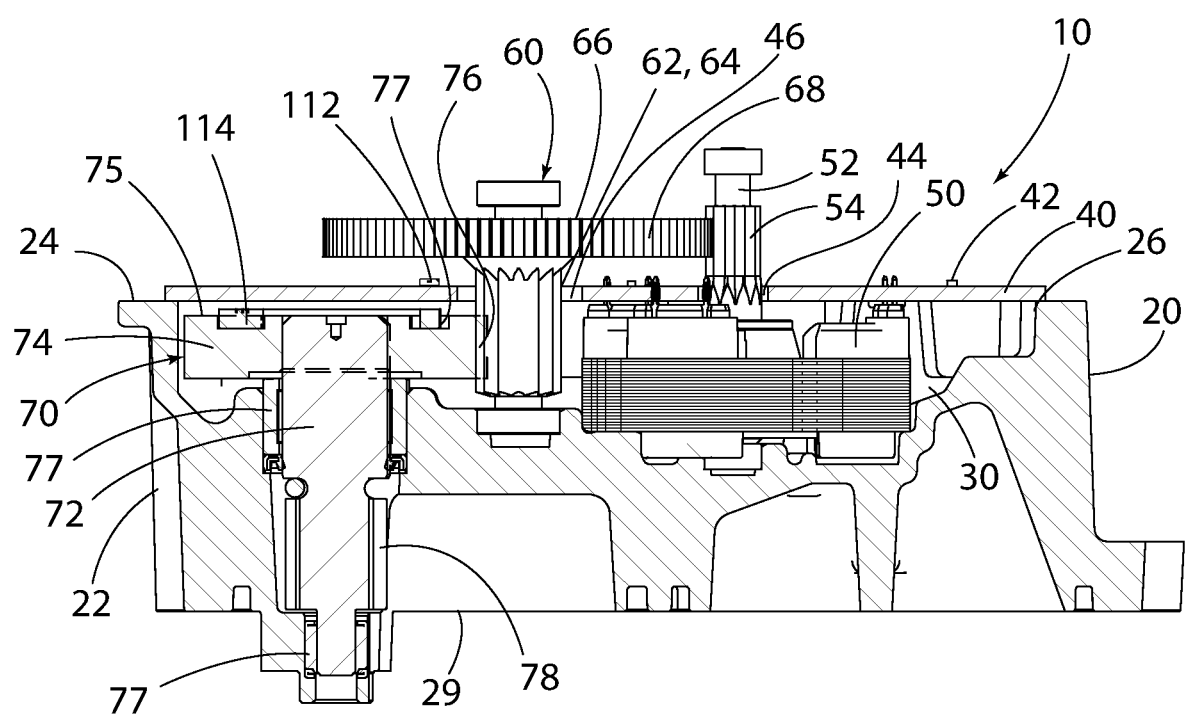
FIG. 3 is a vertical cross-sectional view of the actuator shown in FIG. 1.

FIGS. 1-5 depict a vehicle engine component actuator 10 incorporating a rotary position sensor assembly 110 in accordance with the present invention.

The actuator 10 comprises a component housing 20 defined by a circumferentially extending exterior vertical wall 22 including a top circumferentially extending radial end face or lip or ledge 24 and defining a top housing opening 26 in communication with an interior hollow component cavity 30.

A printed circuit board or substrate 40 extends in a generally horizontal relationship generally normal to the vertical housing wall 22, is seated on top of the radial end face 24 of the housing wall 22, and covers the top housing opening 26.

The printed circuit board 40 includes a plurality of electrical components 42 mounted on top and bottom exterior surfaces or faces thereof including a Hall Effect latch/switch 112 which, in the embodiment shown, is seated on the top exterior surface or face of the printed circuit board 40. The printed circuit board 40 also defines a pair of circular through-holes 44 and 46 extending through the body thereof and terminating in respective openings in the top and bottom exterior surfaces of the printed circuit board 40.

The actuator 10 comprises an electric actuator motor 50 that is located and seated in the interior housing cavity 30. An elongate rotatable motor output shaft 52 extends outwardly from the motor 50 in a vertical direction and orientation generally spaced and parallel to the vertical housing wall 22 and normal to the printed circuit board 40 and includes a distal toothed end 54 extending through the through-hole 44 defined in the printed circuit board 40.

The actuator 10 also comprises a rotatable intermediate gear assembly 60 including a vertical elongate gear shaft 62 including a toothed lower end 64 and a horizontal planetary gear 66 at an upper end thereof with an exterior circumferentially extending toothed vertical side face 68.

The intermediate gear assembly 60 is located in the actuator 10 in a relationship with the toothed lower end 64 extending through the through-hole 46 defined in the printed circuit board 40 and into the housing interior cavity 30 and with the planetary gear 66 located and positioned exterior of the actuator 10 and the printed circuit board 40 in a relationship and orientation spaced from and parallel to the exterior upper surface of the printed circuit board 40 with the toothed vertical end face 68 of the gear 66 in toothed engaged relationship with the toothed distal end 54 of the motor output shaft 52.

The actuator 10 still further comprises a rotatable output gear assembly 70 located in the interior housing cavity 30 and including a vertical elongate gear shaft 72 and a horizontal planetary gear 74 at an upper end thereof including an exterior circumferentially extending toothed vertical side face 76.

The output gear assembly 70 is located and seated in the interior cavity 30 of the housing 20 in a relationship with the gear shaft 72 oriented in a relationship generally spaced and parallel to the vertical housing wall 22 and including a lower toothed end 78 coupled to a lower base wall 29 of the housing 20 and adapted for connection to a vehicle engine component adapted for actuation by the actuator 10 including, for example, the vanes of a vehicle engine turbocharger. The planetary gear 74 extends and is orientated in a relationship spaced and parallel to the lower exterior surface or face of the printed circuit board 40.

A pair of bearings 77 in the housing cavity 30 mount the output shaft 72 for rotation in and relative to the housing 20.

The planetary gear 74 includes a top exterior radial end surface or face 75 defining an interior ring shaped and circumferentially extending cavity or recess 77 extending into the end face 75 of the gear 74 and further defining a plurality of grooves 79. A pair of opposed and spaced apart grooves 79 are defined in and extend into the opposed spaced apart gear walls defining the ring shaped cavity 77 in a co-linear relationship while another of the grooves 79 is spaced on the output gear 74 from the pair of grooves 79 and extends into the inner one of the gear walls defining the ring shaped cavity 77.

In accordance with the operation of the actuator 10, the activation of the actuator motor 50 results in the rotation of the motor output shaft 52 which in turn results in the rotation of the actuator intermediate gear assembly 60 coupled to the motor output shaft 52 via the intermediate gear 66 coupled to the motor output shaft 52 which in turn results in the rotation of the actuator output gear assembly 70 coupled to the intermediate gear assembly 60 via the output gear 74 that is coupled to the lower end 64 of the intermediate gear shaft 62 which in turn results in the rotation of the actuator output shaft 72 which in turn results in the rotation of the lower end 78 of the output gear shaft 62 that is coupled to the vehicle engine component which in turn results in the activation of the vehicle engine component (not shown) such as, for example, the activation/movement of the vanes of a vehicle engine turbocharger.

The actuator 10 further comprises a rotary position sensor 110 in accordance with the present invention and adapted for sensing the rotary position of the output gear shaft 72 and thus the position of the vehicle engine component (not shown) coupled to the output gear shaft 72.

The rotary position sensor 110 comprises a patterned ring magnet 114 mounted to and seated on the upper exterior horizontal end face 75 of the horizontal planetary gear 74 of the output gear assembly 70 in a relationship generally spaced and parallel to the lower exterior horizontal surface or face of the printed circuit board 40. The patterned ring magnet 114 is rotatable in response to the rotation of the gear 74 of the output gear shaft assembly 70.

Figure 4:
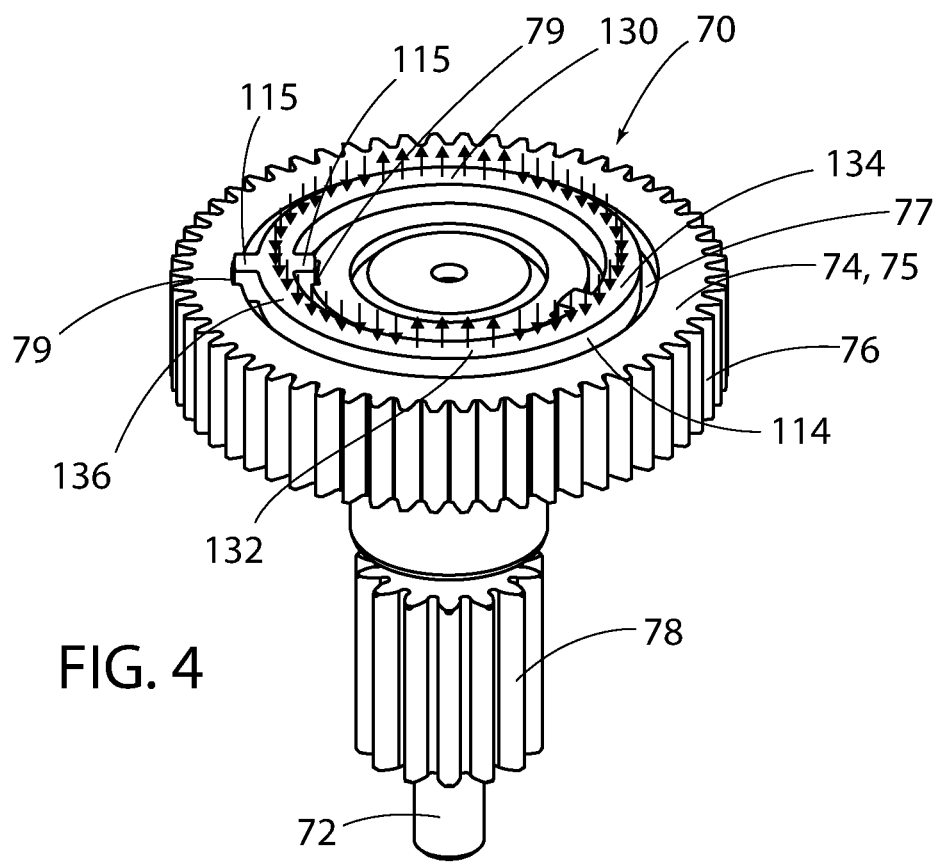
FIG. 4 is a perspective view of the actuator output gear assembly and depicting the direction of the magnetic field generated by the multiple magnetic North and South Pole pairs of the patterned ring magnet mounted on the output gear.
Figure 5:
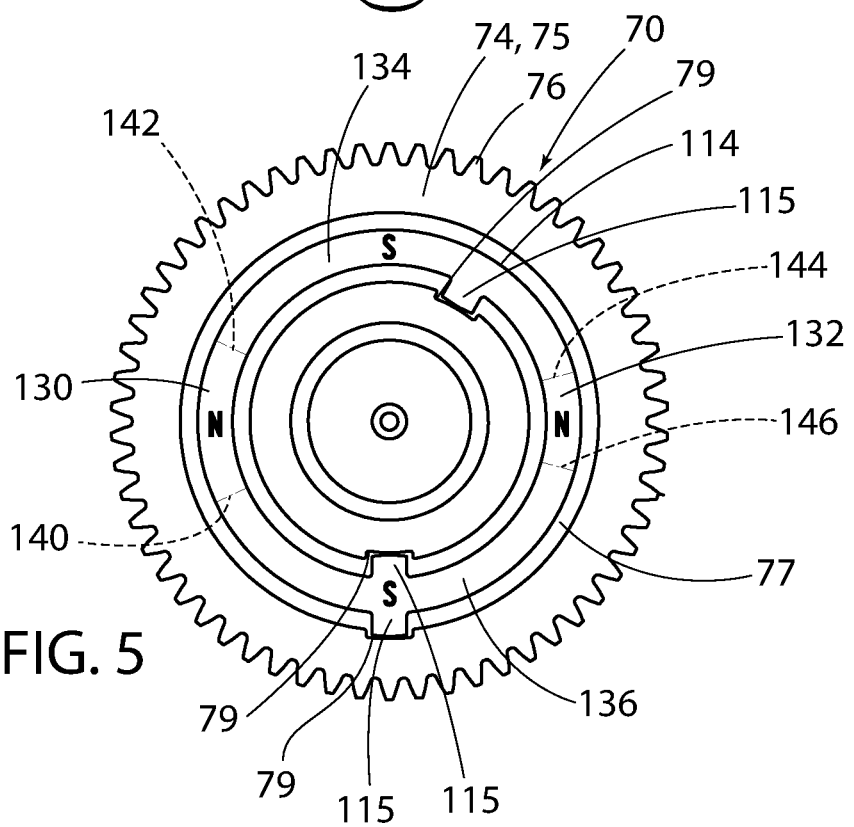
FIG. 5 is a top plan view of the actuator output gear assembly and depicting the multiple magnetic North and South Pole pairs of the patterned ring magnet mounted on the output gear.

Specifically, and as shown in FIGS. 4 and 5, the patterned ring magnet 114 is seated in the interior of the ring shaped cavity 77 defined in the radial end face 75 of the output gear 74. The ring magnet 114 also includes a plurality of tongues or fingers 115 extending normally outwardly from one or both of the exterior side surfaces or faces of the body of the ring magnet 114.

More specifically, the ring magnet 114 includes a first pair of fingers 115 extending outwardly from opposed sides of the ring magnet 114 in a diametrically opposed and co-linear relationship. The ring magnet 114 also includes a third finger 115 that is spaced on the ring magnet 114 from the pair of fingers 115 and extends outwardly from the inner side surface of the ring magnet 114.

Still more specifically, the patterned ring magnet 114 is seated and located in the ring shaped cavity 77 defined in the top exterior face of the output gear 74 in a relationship with the pair of tongues 115 on the ring magnet 114 extending respectively into the pair of grooves 79 defined in the top exterior face 75 of the output gear 74 and the third one of the tongues 115 on the ring magnet 1114 extending into the third one of the grooves 79 formed in the top exterior face 75 of the output gear 74.

In accordance with the present invention, the combination of the tongues 115 and grooves 79 are adapted to properly locate/index the ring magnet 114 on the output gear 74, and the pair of cooperating tongues 115 and grooves 79 prevent the ring magnet 114 from being seated on the output gear 74 in an inverse/reverse relationship.

The rotary position sensor 110 further comprises the Hall Effect switch or latch 112 that is mounted and seated on the top exterior surface of the printed circuit board 40 in a relationship and orientation overlying and generally vertically co-linearly aligned with the ring-shaped patterned ring magnet 114. In the embodiment shown, the printed circuit board 40 is located between and separates the Hall Effect switch/latch 112 from the patterned ring magnet 114.

The switch 112 may comprise any element suitable for sensing a change in the direction of the magnetic pole orientation of the patterned ring magnet 114 including for example a Hall Effect switch/latch, an MR (magnetic resonance switch), or a TMR (tunnel magnetoresistance) switch.

In accordance with the present invention, the ring magnet 114 is magnetized to generate a magnetic field pattern including a plurality of/multiple curvilinear shaped and circumferentially extending adjoining and abutting pairs of North and South magnetic field pole sections or segments adapted to allow the sensing of a plurality of/multiple positions of the magnet 114 and thus adapted to allow the sensing of a plurality of/multiple unique and distinct positions of the actuator output shaft assembly 70 which in turn allows the position of the vehicle component to be determined such as for example the position of the vanes of a vehicle engine turbocharger.

In the embodiment as shown in FIG. 4, the ring magnet 114 has been magnetized in a manner and magnetic field pattern including a plurality of pairs of North and South magnetic field pole sections or segments extending along the circumference of the ring magnet 114 in an axial direction relative to the output gear 74. In another embodiment not shown in which the ring magnet 114 surrounds the exterior circumferential face 76 of the output gear 74, the ring magnet 114 can be magnetized in a manner and magnetic field pattern including a plurality of pairs of North and South magnetic field pole segments or sections extending along the circumference of the ring magnet 114 in a radial direction relative to the output gear 74.

Further, in the embodiment of FIGS. 4 and 5, the ring magnet 114 has been magnetized in a manner and magnetic field pattern including a plurality of alternating North (N) and South (S) Pole sections or segments and more specifically, in the embodiment shown, a first pair of diametrically opposed and curvilinear shaped North Pole sections or segments 130 and 132 and a second pair of diametrically opposed and curvilinear shaped South Pole sections or segments 134 and 136 extending around the circumference of the ring magnet 114 in an adjoining, abutting, and alternating North and South Pole relationship.

Still further, in the embodiment shown, the ring magnet 114 is patterned in a relationship in which each of the North and South magnetic Pole sections or segments 130, 132, 134, and 136 includes a different predetermined and preselected length corresponding to each of the unique and distinct predetermined and preselected output shaft positions adapted to be sensed.

Still further, in accordance with the present invention, the plurality of magnet pole sections or segments 130, 132, 134, and 136 of predetermined and preselected length define and from a plurality of/multiple predetermined and preselected magnet pole interface or switch points 140, 142, 144, and 146, i.e. a plurality of predetermined and preselected points or locations along the circumference of the ring magnet 114 wherein the magnetization orientation/direction of the magnetic field generated by the ring magnet 114 switches from North to South and vice versa, and corresponding to the plurality of unique predetermined and preselected output shaft positions adapted to be sensed and determined by the Hall Effect switch/latch 112.

Figure 6:
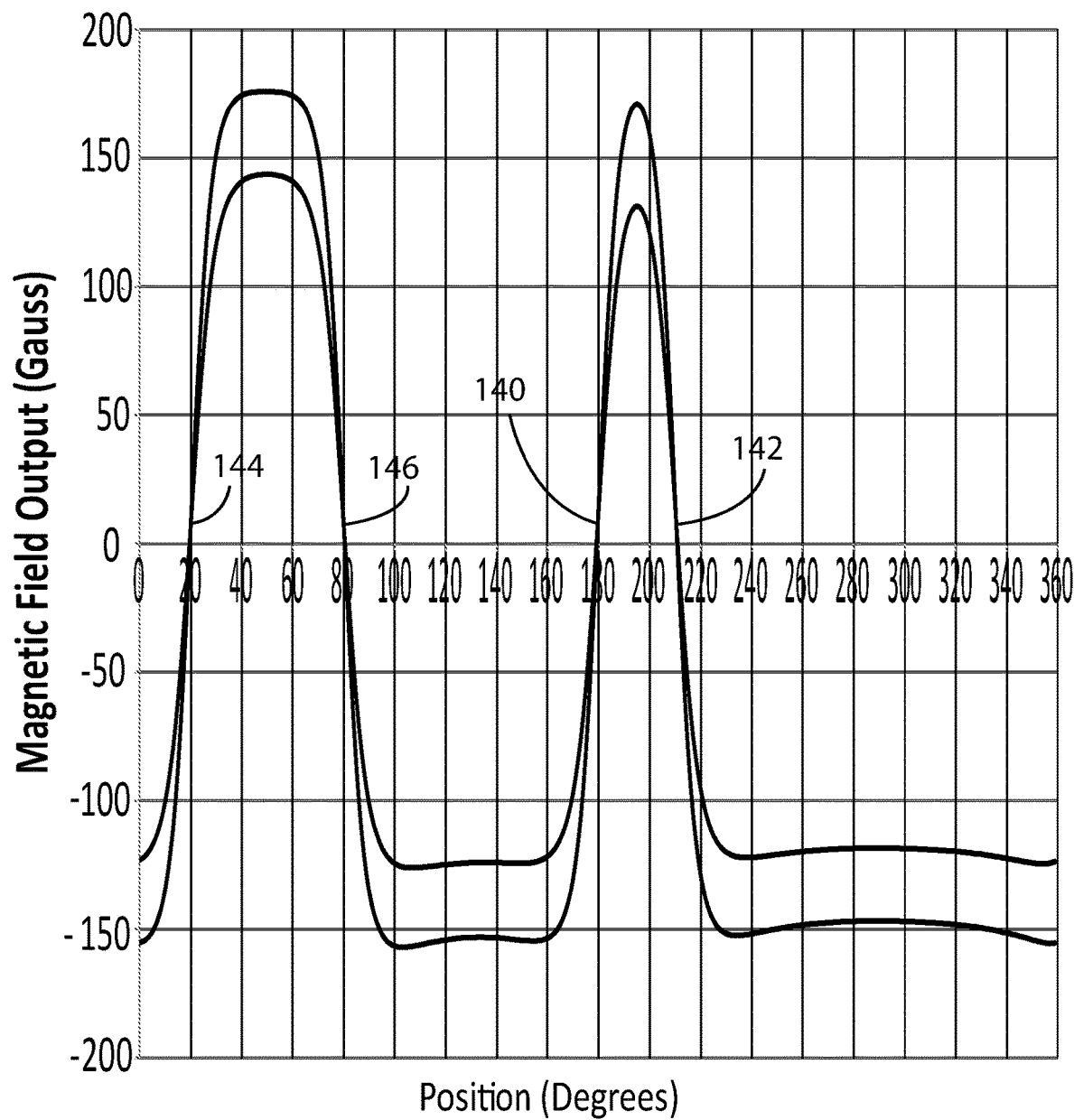
FIG. 6 is a graph depicting the performance of the rotary position sensor of the present invention.

The graph of FIG. 6 depicts the four switch points 140, 142, 144, and 146 and thus the four unique output shaft positions adapted to be sensed.

In accordance with the present invention, it is understood that the number and length of the plurality of magnetic pole sections or segments 130, 132, 134, and 136 formed and defined in the ring magnet 114 and thus the number and position/location of the plurality of magnet pole interface or switch points 140, 142, 144, and 146 extending along the circumference of the ring magnet 114 may be varied depending on the number of unique and separate output shaft positions adapted to be sensed by the Hall Effect switch/latch 112.

Numerous variations and modifications of the actuator with rotary position sensor as described above may be effected without departing from the spirit and scope of the novel features of the invention. It is to be understood that no limitations with respect to the specific rotary position sensor illustrated herein are intended or should be inferred. It is, of course, intended to cover by the appended claims all such modifications as fall within the scope of the claims.

What is claimed is:

1. A rotary position sensor comprising:
   a rotatable ring magnet including at least a first pair of diametrically opposed North Pole sections and at least a first pair of diametrically opposed South Pole sections extending around the ring magnet in an alternating relationship, each of the North and South Pole sections having a length;
   a rotatable shaft including an end face defining a cavity, the ring magnet being mounted in the cavity, one of the shaft and the ring magnet defining a groove and the other of the shaft and the ring magnet including a finger fitted within the groove for indexing the ring magnet on the shaft; and a switch spaced from the ring magnet and adapted for sensing changes in the magnetic field generated by the ring magnet in response to the rotation of the ring magnet relative to the switch, the length of the respective North and South Pole sections of the ring magnet being predetermined to correspond to the one or more positions of the ring magnet adapted for sensing by the switch.

2. The rotary position sensor of claim 1 wherein each of the North and South Pole sections has a different length for sensing different positions of the ring magnet.

3. The rotary position sensor of claim 1 wherein the ring magnet is magnetized in an axial direction relative to the output shaft.

4. The rotary position sensor of claim 1 wherein the switch is a Hall Effect switch.

5. A rotary position sensor adapted for sensing the position of a rotatable output shaft on an actuator, the rotary position sensor comprising:

a ring magnet mounted to the output shaft and rotatable in response to the rotation of the output shaft, the ring magnet being magnetized to include at least a first pair of diametrically opposed North Pole sections and at least a first pair of diametrically opposed South Pole sections extending around the ring magnet in an alternating relationship, each of the North and South Pole sections having a length;

the ring magnet being mounted to an output gear of the actuator, the output gear defining a cavity adapted to receive the ring magnet and at least a first groove and the ring magnet including at least a first finger fitted within the at least first groove for indexing the ring magnet on the output gear; and a switch spaced from the ring magnet and adapted for sensing changes in the magnetic field generated by the ring magnet in response to the rotation of the ring magnet and the output shaft relative to the switch, the length of the respective North and South Pole sections of the ring magnet corresponding to a plurality of positions of the ring magnet adapted for sensing by the switch.

6. The rotary position sensor of claim 5 wherein the North and South Pole sections have different lengths corresponding to different positions of the ring magnet adapted for sensing by the switch.

7. An actuator comprising:

a housing defining an interior cavity;

an actuator motor located in the interior cavity;

a plurality of gears located in the housing including a rotatable output gear defining a cavity adapted to receive the ring magnet and at least a first groove and the ring magnet including at least a first finger fitted within the at least first groove for indexing the ring magnet on the output gear; and a ring magnet mounted to the output gear and rotatable in response to the rotation of the output gear, the ring magnet being magnetized to include a plurality of North and South Pole sections, each of the North and South Pole sections having a length; and a switch spaced from the ring magnet for sensing changes in the magnetic field generated by the ring magnet in response to the rotation of the ring magnet and the output gear relative to the switch, the length of the respective North and South Pole sections of the ring magnet corresponding to a plurality of positions of the ring magnet and the output gear adapted for sensing by the switch.

8. The actuator of claim 7 wherein the ring magnet has been magnetized in a pattern including a plurality of diametrically opposed pairs of North and South Pole sections extending around the circumference of the ring magnet in an alternating and abutting relationship and defining a plurality of North and South Pole switch points extending around the circumference of the ring magnet and corresponding to the plurality of positions of the ring magnet and the output gear assembly adapted for sensing by the switch.

9. The actuator of claim 7 wherein the switch is a Hall Effect switch.

* * * * *